United States Patent [19]
Anand et al.

[11] 3,791,414
[45] Feb. 12, 1974

[54] FLOW INVERTER
[75] Inventors: Joginder N. Anand, Midland;
Arthur F. Roche, Freeland, both of Mich.
[73] Assignee: The Dow Chemical Company, Midland, Mich.
[22] Filed: Dec. 23, 1971
[21] Appl. No.: 211,415

[52] U.S. Cl. .................................. 138/37, 138/39
[51] Int. Cl. ......................... F15d 1/02, F15d 1/06
[58] Field of Search .......................... 138/37, 39

[56] References Cited
UNITED STATES PATENTS
3,128,794   4/1964   Boucher ............................ 138/37
2,553,141   5/1951   Maynard ........................... 138/37

FOREIGN PATENTS OR APPLICATIONS
891,212   3/1962   Great Britain ..................... 138/37
808,766   7/1951   Germany ........................... 138/37

Primary Examiner—Herbert F. Ross
Attorney, Agent, or Firm—Robert B. Ingraham

[57]     ABSTRACT

A flow inverter is provided which is readily prepared from sheet- or plate-like elements.

7 Claims, 8 Drawing Figures

3,791,414

FLOW INVERTER

Flow inverters are employed within pipelines to effectively position the central part of a flowing stream adjacent the inner wall of the pipe or conduit and to shift the outer portion of the incoming stream to a more central location. Typical flow inverters are shown in US Pat. Nos. 3,128,794; 3,470,912 and 3,470,913. For many applications it is undesirable to prepare flow inverters by casting or complex machining procedures.

It would be beneficial if there were available an improved flow inverter which could be readily prepared from sheet-like elements such as sheet metal or plate with minimal machining or forming.

It would also be desirable if there were available a flow inverter in which there is provided almost any desired number of channels.

These benefits and other advantages in accordance with the present invention are achieved in a flow inverter, the flow inverter adapted to be disposed within a conduit, the flow inverter comprising first and second generally planar elements, each of the planar elements defining at least a first or inner channel and a second or outer channel, the planar elements being disposed in fixed spaced generally parallel relationship with the first element inner channel generally opposite the second element outer channel and the first element outer channel generally opposite the second element inner channel, a generally annular stream divider affixed to and extending generally perpendicular to the first element and extending away from the second element, the flange encircling the first element inner channel.

Further features and advantages of the present invention will become more apparent from the following specification taken in connection with the drawing wherein.

Figure 1:
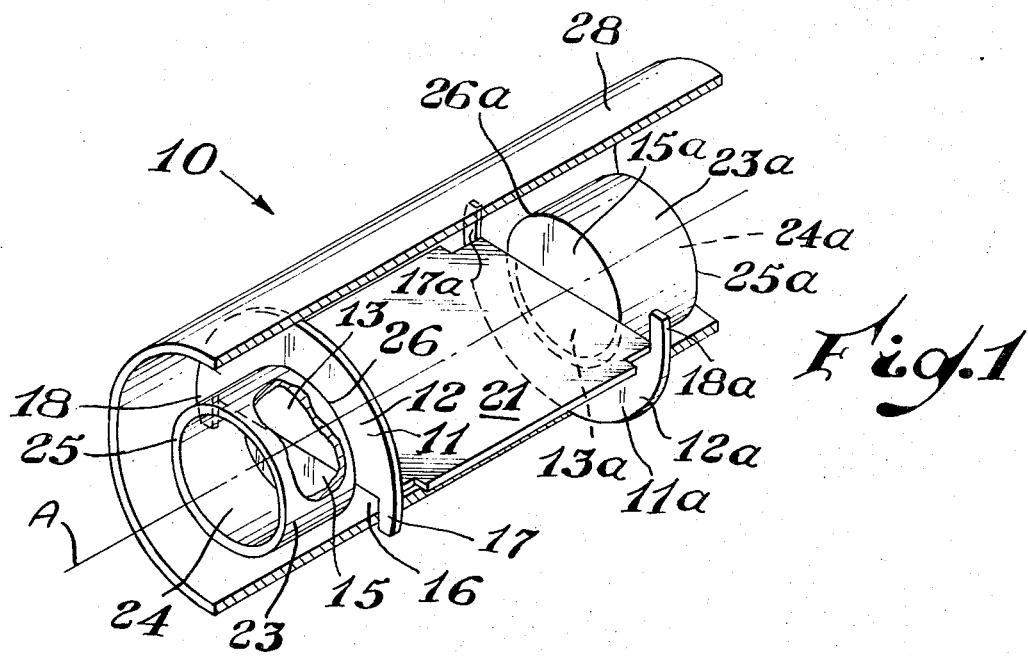
FIG. 1 depicts a stream inverting element in accordance with the present invention disposed within a conduit.

In FIG. 1 there is depicted a partly cut away view of a stream inverting element generally designated by the reference numeral 10. The stream inverting element 10 has a longitudinal axis A, and the element 10 comprises a first generally planar flow deflecting element 11. The element 11 has the general configuration of a sector of a large circle or semicircle and a similar sector of a small circle joined at their linear edges. The element 11 has the first portion 12 having defined therein a generally semi-circular or inner passageway 13 and a second generally semi-circular portion 15 joined thereto. The element 11 has an outer channel or passage 16. A pair of locating or positioning tabs or projections 17 and 18 form opposite corners of the element 11 and generally conform to projections of the arcuate edges of the element 11. The element 11 is disposed in a plane generally normal to the axis A. A second flow diverting element 11a is disposed in generally parallel fixed relationship to the element 11. The configuration of the elements 11 and 11a as depicted in FIG. 1 is generally identical and like parts are designated with like reference numerals. However, the parts of element 11a have a appended thereto. A spacing and internal passage forming means or body 21 is connected between the elements 11 and 11a. Conveniently, the body 21 is integral with the elements 11 and 11a and lies in a plane which is generally parallel to the axis A. A first stream or flow divider 23 is affixed to the element 11 remote from the body 21. The divider 23 has a generally hollow cylindrical configuration and defines therein a passage 24 generally coaxially disposed relative to the axis A. The divider 23 has a first end 25 remote from the element 11 and a second end 26 affixed to the element 11. The passage 24 of the flow divider 23 communicates with the passage 13 of the element 11. The element 10 is disposed within a conduit 28.

In operation of the stream inverting element 10 liquid flowing from left to right in the conduit is divided by the divider 23 into two parts, an inner generally cylindrical core within the passage 24 and an exterior generally annular portion disposed between the outer surface of the divider 23 and the adjacent inner surface of the conduit 28. Material in the passage 24 is discharged through the inner passageway 13 or first internal passage to occupy space between the upper surface of the body 21 and the adjacent inner surface of the conduit 28 which in turn is discharged from the outer passageway 16a of the element 11a and flows about the generally annular stream divider 23a to form a generally hollow cylindrical stream. The annular stream disposed between the divider 23 and the conduit 28 flows through the outer passage 13 of the element 11 and is disposed between the lower face of the body 21 and the inner adjacent surface of the conduit 28, which define a second internal passage, from which the stream flows through the inner passage 13a of the element 11a and is discharged from the passageway 24a of the divider 23a in an axially disposed cylindrical form. The action of the flow inverter 10 has been described in terms of flow from left to right; operation is the same if the direction of flow is reversed. For applications where frequent flow inversion is desired in a conduit, the divider 23a may be omitted and a plurality of such elements stacked in a conduit wherein the first end 25 of the divider 24 is in contact with the element 11a of an immediately adjacent like element. The locating tabs or projections, such as the tabs 16, 17, 16a and 17a are employed with benefit to engage the inner surface of a conduit such as the conduit 28 to prevent tilting of the axis of the flow inverting element relative to the axis of the conduit in installation where the inverters are not welded or otherwise attached to the surrounding conduit.

Figure 2:
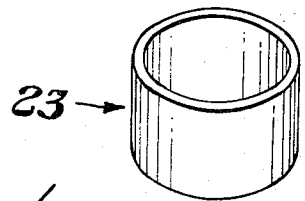
FIGS. 2, 3 and 4 depict components and a preform of the element of FIG. 1.
Figure 4:
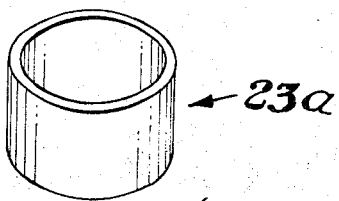
Figure 3:
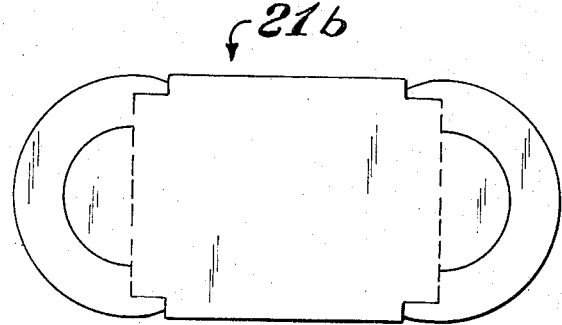

In FIGS. 2, 3 and 4 are shown the components and a preform of the inverter 10. FIGS. 2 and 4 show the flow dividers 23 and 23a which conveniently are formed from prefabricated tubing or bent from rectangular sheet. FIG. 3 depicts a cut sheet or preform 21b from which the elements 11 and 11a and the body 21 of the element 10 are readily formed by appropriate bending along the dotted lines.

Figure 5:
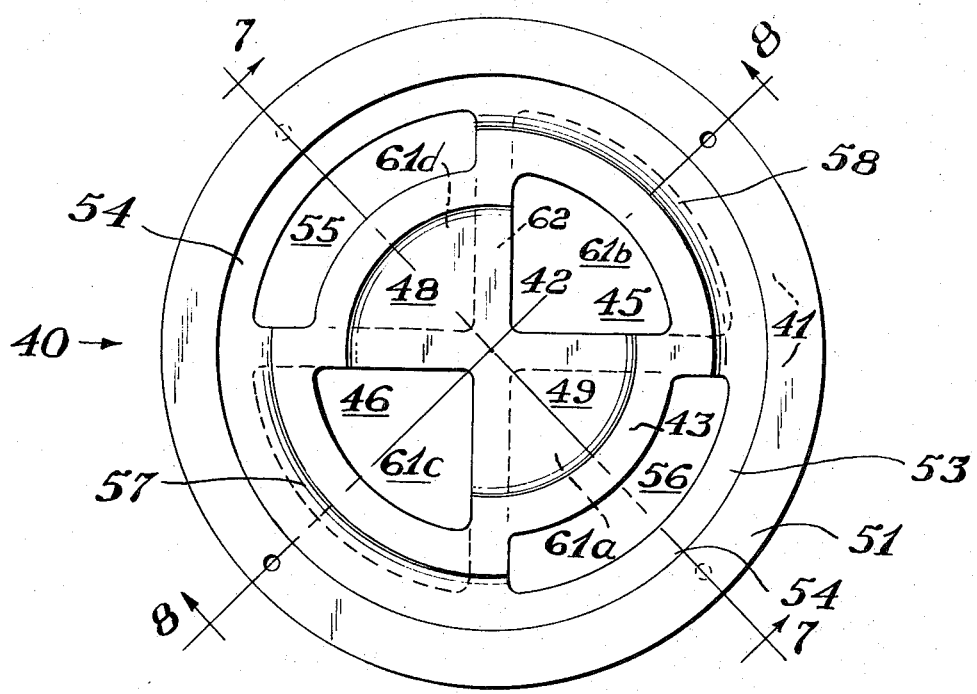
FIG. 5 is an end view of an alternate embodiment of the invention.
Figure 7:
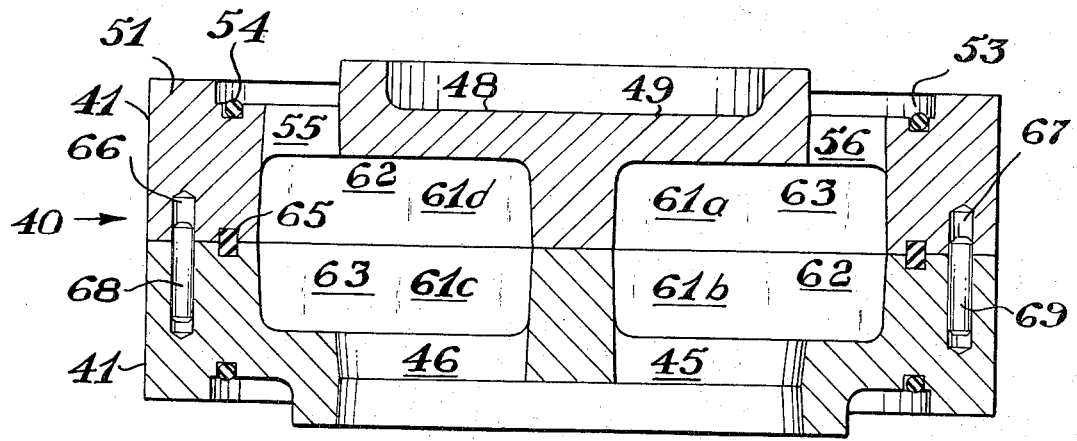
FIG. 7 is a sectional view of the element of FIG. 5 taken along the line 7—7.
Figure 8:
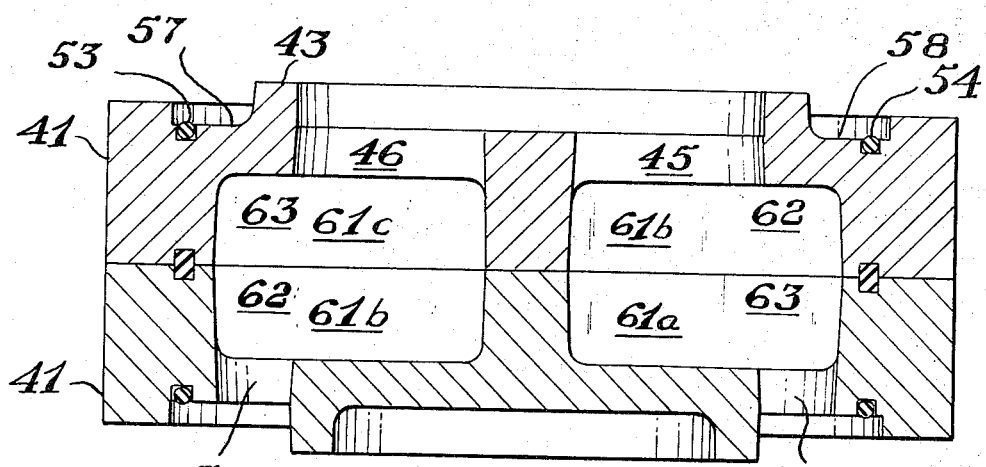
FIG. 8 is a sectional view of the inverter of FIG. 5 taken along the line 8—8.

In FIG. 5 there is depicted an end view of an alternate flow divider generally designated by the reference numeral 40. The divider 40 comprises two identical body portions, both numbered 41. The relationship of the two body portions 41 is shown in FIGS. 7 and 8. Each of the body portions 41 has a generally plate-like configuration. The body portions 41 define a flow dividing means 43 having a generally circular configuration. The body portions 41 define a first inner opening in the passageway 45 and a second inner passageway 46. The passageways 45 and 46 are generally symmetrically disposed about the center of the body 41 and are encircled by the flow divider 33. The body 41 has flow deflecting surfaces 48 and 49 disposed between the passages 45 and 46. The body 41 has a generally external mounting flange 51 of circular configuration. The body 41 adjacent the flange 51 defines a conduit receiving recess 53. In communication with the conduit receiving recess is a sealing means or O-ring 54 adapted to sealably engage the conduit terminus. A pair of second or external passages 55 and 56 are defined in the body external to the flow divider 43. The passages 55 and 56 are disposed generally between the passages 45 and 46. Between the passages 55 and 56 are external flow deflecting surfaces 57 and 58. Four recesses 61a, 61b, 61c and 61d are defined by the body 41 remote from the flow divider 43 by generally diametrical ribs or spacing means 62 and 63.

Figure 6:
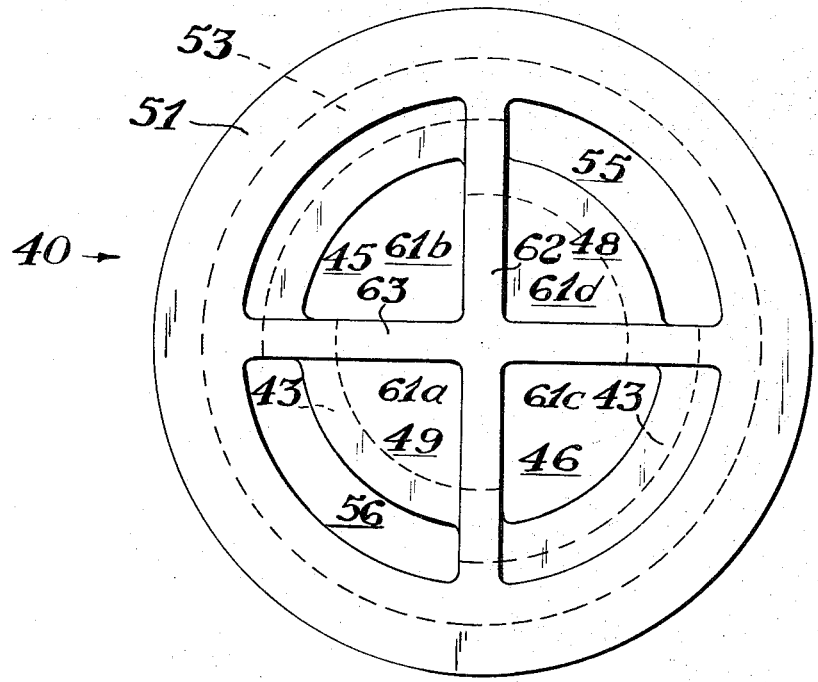
FIG. 6 is a rear view of one half of the inverter of FIG. 5.

FIG. 6 depicts a rear view of the body 41 showing the sector-like configuration of the recesses 61a, 61b, 61c and 61d.

In FIGS. 7 and 8 there is depicted a sectional view of the flow divider 40 taken along the lines 7—7 and 8—8 of FIG. 5, respectively. The body portions 41 remote from the flow divider 43 define an O-ring or sealing means receiving groove 65 and first and second indexing recesses 66 and 67 adapted to receive a pin or locating means such as the pins 68 and 69 in order to provide positive location of the body portions 41 relative to each other. The body portions 41 have an identical configuration. The portions 41 can be considered to be in back-to-back relationship and rotated 90° relative to each other. Adjacent recesses 61 within the adjacent body portions 41 form generally sector-like cavities or internal passages providing communication between the outer and inner passages of different body portions 41. The recesses 61 within each body portion 41 are generally isolated from each other by one of the ribs 62 or 63. The ribs 62 and 63 of the opposing body portions 41 cooperate to form separating means between adjacent sector-like cavities.

In the sectional views shown in FIGS. 7 and 8 it can be readily seen that material entering the outer passageways 55 and 56 is forced to flow out of the flow inverter through the passageways 45 and 46, through the recesses 61c and 61d and the recesses 61b and 61a, respectively, while the material entering the passageways 45 and 46 is forced to flow out of the outer passages 55 and 56 providing flow inversion in basically the same manner as the embodiment set forth in FIG. 1. Generally flow inverters in accordance with the present invention can be made with any desired number of openings in excess of two. However, it is generally desirable that an even number of passages are being employed; that is, 2, 4, 6, 8. If an odd number of passages is employed, generally increased pressure drop results.

As is apparent from the foregoing specification, the present invention is susceptible of being embodied with various alternations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A flow inverter, the flow inverter adapted to be disposed within a conduit, the flow inverter comprising first and
   second generally planar elements, each of the planar elements defining with the inner walls of the conduit at least
   a first or inner passage and
   a second or outer passage, the planar elements a flow separating element disposed between the first and second planar elements, being disposed in fixed spaced generally parallel relationship with the first element inner passage generally opposite the second element outer passage and the first element outer passage generally opposite the second element inner passage,
   a generally annular stream divider affixed to and extending generally perpendicular to the first element and extending away from the second element, and at least a peripheral portion of the planar elements adapted to engage the conduit.

2. The flow inverter of claim 1 having at least two first passageways and two second passageways in each of the planar elements.

3. The flow inverter of Claim 1 wherein the stream divider of the first generally planar element is integral therewith and the second element has a like stream dividing element.

4. The flow inverter of claim 1 where the first and second generally planar elements each define two inner passageways and two outer passageways.

5. A flow inverter of generally plate-like configuration adapted to be inserted in a conduit the flow inverter comprising first and
   second generally planar elements forming said plate-like inverter, each of the planar elements defining at least
   a first and
   a second inner channel and
   a first and
   a second outer channel, the inner and outer channels of each element being generally diametrically opposed, the first and second elements being fixed to each other in generally parallel relationship transverse to the flow in the conduit with the inner channels of the first element generally opposite the outer channels of the second element, each element having
   a generally annular stream divider affixed thereto and extending generally perpendicular to the planar elements, the stream divider being remotely disposed from each other and each of the stream dividers encircling the inner channels, and at least a peripheral portion of the planar elements adapted to engage a conduit.

6. The flow inverter of claim 5 wherein the first and second planar elements are of like configuration.

7. The flow inverter of claim 6 including first and second rib members generally diametrically disposed and oppositely disposed to the flow dividing means.

* * * * *

UNITED STATES PATENT OFFICE
CERTIFICATE OF CORRECTION

Patent No. 3,791,414            Dated February 12, 1974

Inventor(s) Joginder N. Anand and Arthur F. Roche

It is certified that error appears in the above-identified patent and that said Letters Patent are hereby corrected as shown below:

Column 3, line 66, the word "alternations" should be --alterations--.

Column 4, line 15, after "passage," and before the word "the", there should be the phrase --a flow separating element disposed between the first and second planar elements,--.

Column 4, in Claim 5, line 57, the word "divider" should be --dividers--.

Signed and sealed this 18th day of June 1974.

(SEAL)
Attest:

EDWARD M. FLETCHER, JR.
Attesting Officer

C. MARSHALL DANN
Commissioner of Patents